July 24, 1928.
N. L. OATES
1,678,019
CALCULATING DEVICE
Filed July 22, 1927
2 Sheets-Sheet 1
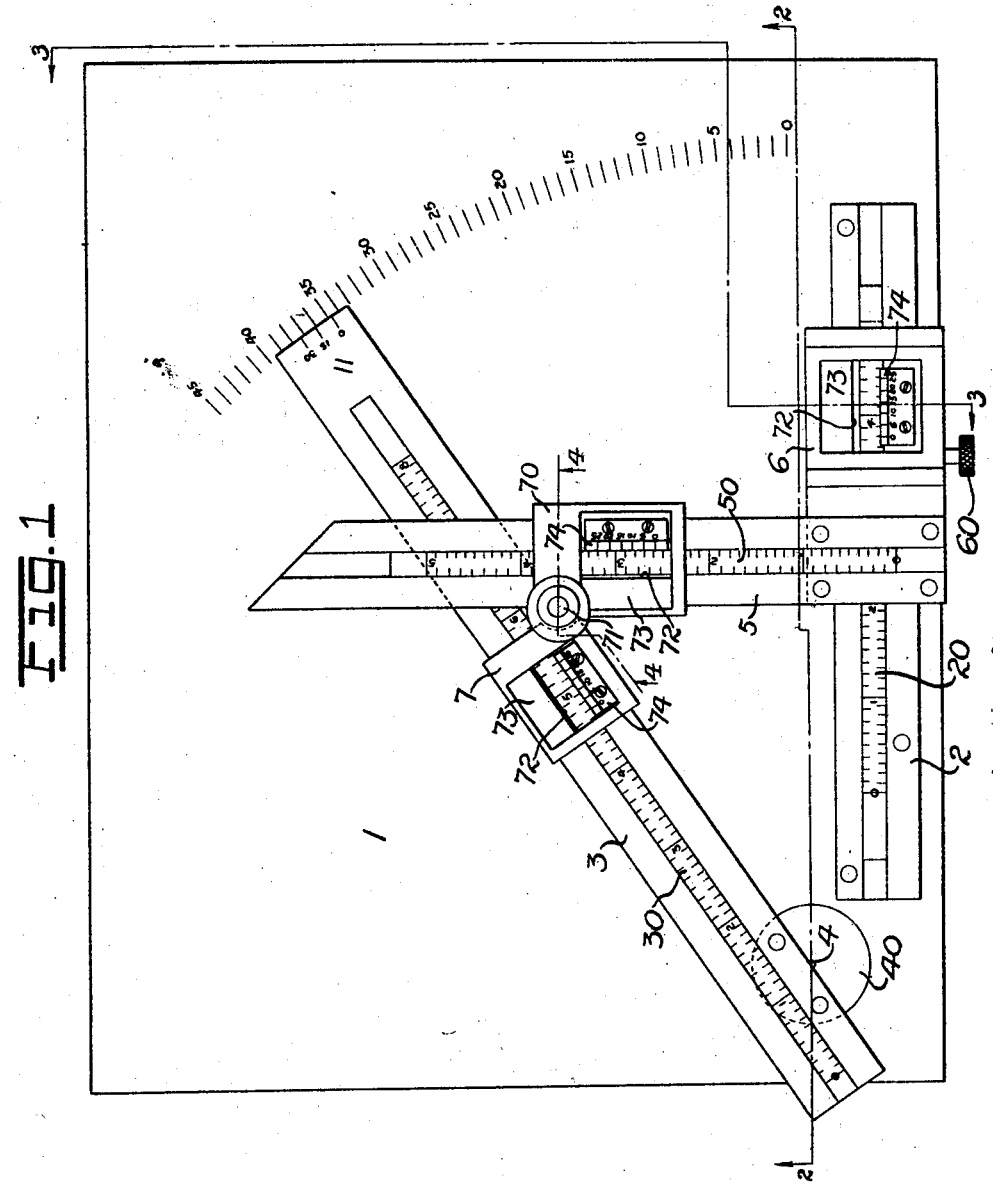
Inventor
Norford L. Oates
By H.L. & C.L. Reynolds
Attorneys July 24, 1928.
N. L. OATES
CALCULATING DEVICE
Filed July 22, 1927
1,678,019
2 Sheets-Sheet 2
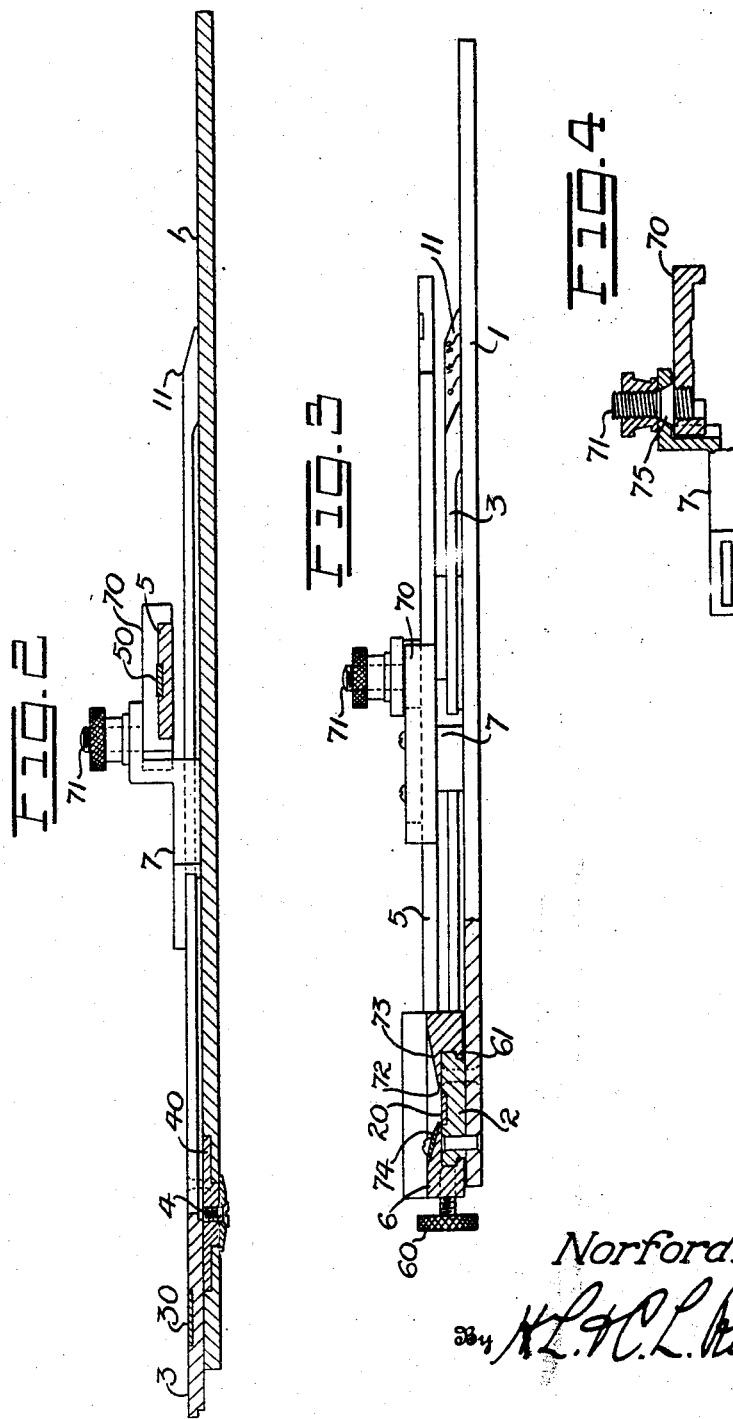
Inventor
Norford L. Oates
By H.L.H.C.L. Reynolds
Attorneys Patented July 24, 1928.

1,678,019

UNITED STATES PATENT OFFICE.

NORFORD L. OATES, OF SEATTLE, WASHINGTON.

CALCULATING DEVICE.

Application filed July 22, 1927. Serial No. 207,658.

My invention consists of an instrument designed for use in determining the functions of right angles. The practical applications of this instrument would be various. For instance, it may be used to locate holes which are to be evenly spaced in a circle. It may be used to determine the exact dimensions of the trigonometric functions of an angle. Various uses to which it may be applied may be seen from a study of the device.

The accompanying drawings illustrate my invention embodied in the type of structure now preferred by me.

Figure 1 is a plan or top face view of the device.

Figures 2 and 3 are sectional views taken, respectively, on the lines 2—2 and 3—3 of Figure 1.

Figure 4 is a section on the line 4—4 of Figure 1, illustrative of the construction of the pivot 71.

In carrying out my invention I employ three members which are combined guide and scale members, these being mounted upon a base so as to be adjustable relative to each other to accurately represent the sides of any trangle within the limit of the device. I also provide an arcuate graduation or scale functioning to determine degrees of angle.

As a base I have shown a plate 1. Fixedly secured to this is a combined guide and scale bar 2, and a second guide and scale bar 3 pivoted to swing about a pivot axis 4, which represents one apex of a triangle. In the construction illustrated, one edge of the bar 3 passes through this axial or pivot point, while the physical pivot consists of a small disc 40 secured to the bar 3 and turning in a suitable bearing in the plate 1.

Mounted to slide upon the bar 2 is a plate or block 6, the bar and block being provided with an undercut or T-shaped cross section illustrated at 61, or otherwise constructed to secure the two in exact relation and to permit free sliding, as desired. Means are provided, such, for instance as set screws 60, for securing the block in adjusted position.

Fixed to the block 6 is a bar 5, having a scale 50 thereon, with its side edges at exact right angles to the guiding side edges of bar 2. The scales 20, 30 and 50, mounted upon the respective bars 2, 3 and 5, may be in any unit of measurement. As illustrated, inch measurements are contemplated. These scales are preferably made as separate bars, seated in grooves or channels provided in the bars 2, 3 and 5, as is clearly shown in Figures 2 and 3.

Mounted to slide upon each of the bars 3 and 5 is a slide frame, 7 and 70, these being provided with complemental pivot or hinge members 71 by which they are connected, the pivot axis being on the intersection of the adjacent edges of the bars 3 and 5. To insure accurate positioning of the centers of slides 7 and 70 and the consequent accurate relationship of the bars 3 and 5, I provide conical bearing surfaces 75 in the pivot between these parts.

The slides 7 and 70 each have an opening 72 of a width to expose a certain length of the scales 30 and 50 carried by bars 3 and 5, the bars left at the sides of these openings preferably being beveled, as shown at 73 in Figure 3. A vernier scale 74 is provided upon one of these surfaces, this being, for practical construction purposes, made as a separate and attached bar. The slide 6 upon bar 2 is provided with a similar vernier scale and opening.

The base plate 1 is provided with an angular scale 10 at the free end of the pivotel bar 3 and concentric with its pivot. The end of bar 3 may also be provided with a vernier scale 11.

The scales carried by the bars 2 and 3 have their zero point based upon the point 4, which is that apex of the triangle upon which bar 3 is pivoted, while the scale upon bar 5 has its zero point based upon the side of the triangle which is parallel with the bar 2.

This does not mean that the zero points of these scales coincide in position with the points upon which they are based. For practical constructional purposes they are offset along the lines to which they correspond an amount equal to and in the same direction as is the reading point for such scale. For instance, the zero point of the scale carried by bar 2 is removed from the pivot 4 in the direction of the length of said bar an amount equal to that by which the reading point (the zero of its vernier scale) is removed from that edge of bar 5 which intersects the pivotal axis which connects bars 3 and 5. Similarly, the scales on bars 3 and 5 are lengthwise offset or displaced from their base points by amounts equal to the displacement of their reading points from their intersecting point, being the pivotal connection between slides 7 and 70.

It is evident from a study of the drawings in the light of the above description that the bars 2, 3 and 5 may be placed in position to represent any right angled triangle. Considered in terms of the trigonometrical functions, bar 3 represents a radius, 5 a sine and 2 a cosine of the angle subtended between bars 2 and 3, or the bar 2 may represent the radius in which the other bars represent the tangent and the secant of the angle.

The device may be used in a shop to determine many problems involving spacing of points on a circle or determining angles, as, for instance, the chordal separation of bolts or bolt holes in a circular group. Many other uses will occur to a mechanic.

What I claim as my invention is:

1. An instrument for solving right angled triangles comprising a base having an arcuate scale, three bars positioned to represent the three sides of a right angle triangle, one of said bars being pivoted at the center of the arcuate scale, a second bar being fixed upon the base in parallelism with an adjacent side of a triangle of which said center is an apex, means for slidably connecting said third bar to the fixed bar, said means holding said third bar at right angles to the said fixed bar, all of said bars having thereon scales which for the pivoted and for the fixed bars are based upon the apex of the triangle represented by the said pivot point and for the third bar upon the side of the triangle to which it is perpendicular, two slides carried one by each movable bar and pivoted together at the intersection of the two sides of the triangle represented by said two bars, said slides carrying indicia cooperating with the scales upon said two bars and each provided with a scale cooperating with the scale upon the respective bars to give vernier readings.

2. An instrument for solving right angled triangles comprising a base having an arc graduated in angular units three bars positioned to represent the three sides of a right-angled triangle, and comprising a scale pivoted concentric with said arc, a scale fixed upon said base and extending from said center outwardly, both of said scales having graduations reading outwardly from and based upon said center as zero, and a third scale mounted perpendicular to said fixed scale and carrying graduations based upon the side of the triangle to which it is perpendicular, means for slidably connecting said third scale to the fixed scale, a slide mounted upon each of said movable scales, said slides being pivoted together at the intersection of the base lines of said movable scales, said slides carrying indicia by which to determine the reading of said scales.

Signed at Seattle, King County, Washington, this 13th day of July, 1927.

NORFORD L. OATES.